US011740905B1

(12) United States Patent
Kudli et al.

(10) Patent No.: US 11,740,905 B1
(45) Date of Patent: Aug. 29, 2023

(54) DRIFT DETECTION IN STATIC PROCESSES (71) Applicant: DIMAAG-AI, Inc., Fremont, CA (US)

(72) Inventors: Rajaram Kudli, Bengaluru (IN); Satish Padmanabhan, Sunnyvale, CA (US); Fuk Ho Pius Ng, Portland, OR (US); Dushyanth Gokhale, Bengaluru (IN)

(73) Assignee: DIMAAG-AI, Inc., Fremont, CA (US)

( * ) Notice: Subject to any disclaimer, the term of this patent is extended or adjusted under 35 U.S.C. 154(b) by 0 days.

(21) Appl. No.: 17/814,684

(22) Filed: Jul. 25, 2022

(51) Int. Cl.
*G06N 5/022* (2023.01)
*G06F 9/30* (2018.01)

(52) U.S. Cl.
CPC ......... *G06F 9/30192* (2013.01); *G06N 5/022* (2013.01)

(58) Field of Classification Search
CPC ...................................................... G06N 5/022
See application file for complete search history.

(56) References Cited

U.S. PATENT DOCUMENTS

| | | | |
|---|---|---|---|
| 8,005,771 B2 | 8/2011 | Chen et al. | |
| 11,295,241 B1* | 4/2022 | Badawy | G06N 20/00 |
| 2006/0074828 A1 | 4/2006 | Heumann et al. | |
| 2019/0005423 A1* | 1/2019 | Pritzkau | G06Q 10/0635 |
| 2020/0091017 A1* | 3/2020 | Musselman | H01J 37/32091 |
| 2020/0192903 A1* | 6/2020 | Bansal | G06F 16/2237 |
| 2021/0365793 A1 | 11/2021 | Surya et al. | |
| 2022/0095871 A1* | 3/2022 | Jakhotia | G05D 1/0234 |
| 2022/0165292 A1* | 5/2022 | Saki | G06N 20/00 |
| 2022/0292340 A1* | 9/2022 | Gogoglou | G06Q 40/08 |

OTHER PUBLICATIONS

Cavalcante et al. (FEDD: Feature Extraction for Explicit Concept Drift Detection in Time Series, Jul. 2016, pp. 740-747) (Year: 2016).*
Lu et al. (Learning under Concept Drift: A Review, Dec. 2019, pp. 2346-2363) (Year: 2019).*
Mowbray et al. (Using process data to generate an optimal control policy via apprenticeship and reinforcement learning, Apr. 2021, pp. 1-15) (Year: 2021).*
Günther et al. (Intelligent laser welding through representation, prediction, and control learning: An architecture with deep neural networks and reinforcement learning, Oct. 2015, pp. 1-11) (Year: 2015).*
U.S. Appl. No. 17/814,682, Final Office Action dated Jan. 13, 2023, 15 pgs.
U.S. Appl. No. 17/814,682, Non Final Office Action dated Sep. 21, 2022, 12 pgs.

(Continued)

*Primary Examiner* — George Giroux
(74) *Attorney, Agent, or Firm* — Polygon IP, LLP (57) ABSTRACT

In many industrial settings, a process is repeated many times, for instance to transform physical inputs into physical outputs. To detect a situation involving such a process in which errors are likely to occur, information about the process may be collected to determine time-varying feature vectors. Then, a drift value may be determined by comparing feature vectors corresponding with different time periods. When the drift value crosses a designated drift threshold, a predicted outcome value may be determined by applying a prediction model. Sensitivity values may be determined for different features, and elements of the process may then be updated based at least in part on the sensitivity values.

18 Claims, 5 Drawing Sheets

(56) References Cited

OTHER PUBLICATIONS

Killick et al., "Optimal detection of changepoints with a linear computational cost", 2012, Journal of the American Statistical Association 107.500, pp. 1590-1598.
Plotnikov et al., "Estimation of the statistical error and the choice of parameters in the method of test particles", 2012, Russ. J. Numer. Anal. Math. Modelling 27.2, pp. 155-173.
Silva et al., "A branch-and-bound inspired technique to improve the computational efficiency of DOA estimation", 2013, Signal processing 93.4, pp. 947-956.

* cited by examiner

DRIFT DETECTION IN STATIC PROCESSES

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

FIELD OF TECHNOLOGY

This patent document relates generally to machine learning and more specifically to the prediction of dynamic time-series data.

BACKGROUND

Machine learning is commonly used to predict data values. For instance, a prediction model is trained using a set of feature values and corresponding observed outcome values. Such training often involves comparing predicted outcome values against observed outcome values to determine one or more error terms and then adjusting one or more model parameters to reduce the one or more error terms.

One type of data used to train prediction models is time-series data. In time-series data, both feature values and outcome values are observed at particular points or intervals in time. A prediction model trained on such a sequence of data may then be used to predict outcomes that have not yet occurred. In such a process, an outcome value observed in the past may be included as a feature value for predicting an outcome value that occurs in the future.

Such techniques have many applications. As only one example of many, a machine learning model may be used to predict defects in a manufacturing process. Because of the wide-ranging importance of prediction models for time-series data, improved techniques for implementing such models are desired.

OVERVIEW

According to various embodiments, systems, apparatus, methods and computer program products described herein facilitate the detection of drift in static processes. In some implementations, a drift value may be determined by comparing a first one or more feature values corresponding with a first time period with a second one or more feature values corresponding with a second time period. A predicted outcome value may be determined by applying a prediction model to a third one or more feature values when it is determined that the drift value crosses a designated drift threshold. A plurality of sensitivity values corresponding with the third one or more feature values may be determined. A respective sensitivity value may indicate a respective degree to which change in a respective feature value affects the predicted outcome value. An instruction may be sent to update a control parameter corresponding with a designated one or more of the feature values based on the plurality of sensitivity values.

In some embodiments, the designated one or more of the feature values may be selected based on the sensitivity values. For instance, the designated one or more of the feature values may be selected based on a respective magnitude of a corresponding sensitivity value. Selecting the designated one or more of the feature values may involve ordering the plurality of sensitivity values based on magnitude. The instruction may include an adjustment magnitude value corresponding with the control parameter.

In some embodiments, one or more simulated feature values may be determined based on the plurality of sensitivity values. A simulated predicted outcome value may be determined by applying the prediction model to the simulated feature values. A plurality of updated sensitivity values corresponding with the plurality of predictors may be determined. A respective updated sensitivity value may indicate a respective degree to which a change in a respective simulated feature value affects the determination of the simulated predicted outcome by the prediction model.

In some embodiments, a determination may be made as to whether the drift value crosses the designated drift threshold. Determining the drift value may involve computing a cosine similarity value via a cosine similarity function based on a subset of the feature values. The subset of the feature values may correspond with a designated time interval. Determining the drift value may include determining a rolling average of a plurality of cosine similarity values.

In some embodiments, the first time period may precede the second time period, the first time period may include a plurality of time intervals, and a subset of the first one or more feature values may correspond with a designated feature. Each of the subset of the first one or more feature values may correspond with a respective one of the plurality of time intervals. Determining the drift value may involve computing an average of the subset of the first one or more feature values. The third one or more feature values may include the first one or more feature values and the second one or more feature values.

BRIEF DESCRIPTION OF THE DRAWINGS

The included drawings are for illustrative purposes and serve only to provide examples of possible structures and operations for the disclosed inventive systems, apparatus, methods and computer program products for detecting drift in dynamic process. These drawings in no way limit any changes in form and detail that may be made by one skilled in the art without departing from the spirit and scope of the disclosed implementations.

DETAILED DESCRIPTION

According to various embodiments, techniques and mechanisms described herein relate to the prediction of time-series data. Data values are analyzed to identify the presence of a drift condition. When a drift condition is detected, feature sensitivity values associated with features in a prediction model may be determined for a set of features. The feature sensitivity values may be used to institute one or more adjustments to avoid the occurrence of an error condition.

According to various embodiments, time-series data refers to data that is observed in accordance with a temporal sequence. For example, the temperature in a given location may be observed once per day, hour, minute, second, or some other interval of time. In some configurations, time-series data may involve observation of data at regular intervals, such as once per second. Alternatively, time-series data may involve observation of data at irregular intervals.

In some implementations, a prediction model may be used to predict future outcomes of time-series data that have not yet been observed. For instance, prediction models are commonly used to predict variables such as the weather temperature, battery levels, machine performance, defects in a manufacturing process, or other such observable states.

According to various embodiments, a prediction model may take as input one or more feature values that were observed in the past. Feature values may include past observations of the outcome variable. For example, a prediction of tomorrow's temperature may depend in part on the temperature observed today. Alternatively, or additionally, feature values may include past observations of other variables. For example, a prediction of tomorrow's temperature may depend in part on barometric pressure observed today.

According to various embodiments, one approach to using a prediction model in a production process may be to use the model to predict defects. For instance, information such as sensor values, production process settings, defect levels, and other data may be used to train and then apply a prediction model that predicts a number of defective products that result from the production process. As a simple example, a prediction model may predict an increased number of defects when a temperature value received from a sensor value in a production process crosses a designated threshold. In practice, prediction models may involve drawing inferences from potentially many such feature values, often collected repeatedly over a period of time.

In some embodiments, a prediction model as applied to a production process may be relatively stable. For example, a manufacturing process may produce a high volume of an output product over some period of time. The same manufacturing process may produce a large amount of data, such as sensor readings from a potentially large number of sensors captured at a relatively short time interval. In such a process, a prediction model may be used to predict defects in the manufacturing process. Because production processes are typically relatively stable by design, the prediction model too may be relatively stable in the sense that the model itself need not be frequently updated based on new data. However, techniques and mechanisms described herein are not limited to stable processes and models, and instead may be applied in a variety of contexts that include a variety of types of time series data and prediction models.

According to various embodiments, the terms "static" and "stable" are used herein to refer to processes that typically exist in a relatively steady state over time, such as manufacturing processes in which the same operations are performed for many repetitions over a lengthy time period. However, as discussed herein, such processes can exhibit changes over time, for instance due to wear associated with mechanical components. Such changes can manifest as "drift" that occur slowly over time and hence can be difficult to observe, but which nevertheless can increase the likelihood of machine failure, a sudden increase in a rate of defects (e.g., by a factor of 50 or 100), or other such negative outcomes.

In some implementations, when a prediction model predicts an unacceptable level of defects in a production process, a controller may be triggered to make one or more adjustments to the production process to proactively reduce the number of defects before they occur. However, one drawback of such an approach is that the time interval between prediction and occurrence of an unacceptable level of defects may be insufficient to alter the process in time to prevent the occurrence of the defects. Another drawback of such an approach is that the prediction model may provide insufficient information about how to update the process to avoid the occurrence of the defects.

According to various embodiments, techniques and mechanisms described herein may be used to identify conditions in which defects are likely to occur in the future, even before a prediction model would predict defects in an upcoming time interval. Such techniques and mechanisms may provide significant benefits. For example, production processes may be made more efficient, with a significantly lower defect rate over the long term. As another example, error conditions are often associated with machine failure, which can result in expensive damage. Accordingly, by avoiding failure conditions, techniques and mechanisms described herein may reduce production costs associated with production processes. As yet another example, techniques and mechanisms described herein may help to proactively identify when machines involved in production processes are in need of maintenance.

According to various embodiments, any of various types of actions may be performed when drift is detected. For instance, a new machine may have a surface finish tolerance for a manufactured part of plus or minus one micron. However, over time some parts of the machine may wear out, causing the tolerance to reduce to plus or minus two microns. Drift detection may be used to identify a machine in such a condition even before the machine's output has observably degraded. Then, the machine could be repaired, moved to produce a different part having a lower tolerance, or otherwise adjusted.

In particular embodiments, techniques and mechanisms described herein may facilitate production processes implemented with a high degree of production quality. For example, a common manufacturing goal is to produce products at a "six sigma" quality level, which entails a long-term defect level below 3.4 defects per million opportunities (DPMO). Obtaining such a performance level is difficult if machines are only serviced or replaced when defects are detected, since at that point defects will already have occurred. However, proactively servicing or replacing machines can increase costs and decrease speeds associated with production processes. Techniques and mechanisms described herein may be used to identify conditions and machines that are likely to generate defects even before a noticeable change is observed in the actual defect rate.

According to various embodiments, the term "production process" as used herein may refer to a any process applied to one or more inputs are to produce one or more outputs. Further, although various embodiments are described as being applicable to reducing "defects", techniques and mechanisms described herein are not limited to physical production processes in which physical objects (which may be potentially be defective) are produced. Instead, techniques and mechanisms described herein are applicable to a variety of processes in which error conditions may occur.

Figure 1:
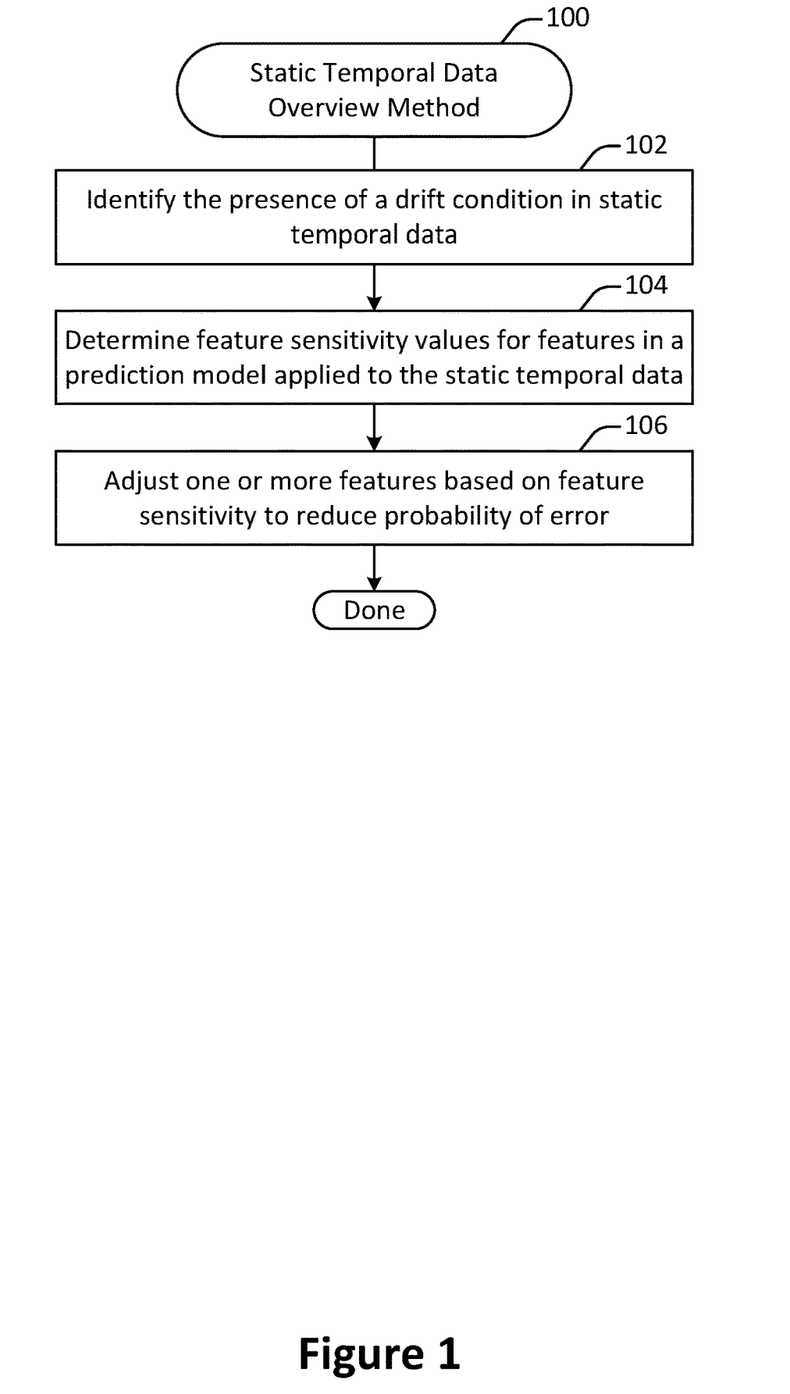
FIG. 1 illustrates an example of an overview method for drift detection in time-series data, performed in accordance with one or more embodiments.

FIG. 1 illustrates an example of an overview method 100 for drift detection in time-series data, performed in accordance with one or more embodiments. According to various embodiments, the method 100 may be performed in any suitable computing device as part of the implementation of a machine learning procedure for identifying drift conditions and controlling one or more features to reduce the probability of an error condition occurring.

The presence of a drift condition in temporal data is identified at 102. According to various embodiments, the presence of a drift condition may be determined by analyzing feature values in time-series data. According to various embodiments, the feature values may be analyzed by comparing a vector or matrix of feature values with other vectors or matrices of feature values. For instance, a cosine similarity measure may be used to compare a vector to one or more other vectors associated with an increased probability of an error condition. Additional details regarding the detection of the presence of a drift condition are discussed with respect to the method 400 shown in FIG. 4.

Feature sensitivity values for features in a prediction model applied to the temporal data are determined at 104. According to various embodiments, feature sensitivity values may be determined by applying a prediction model to one or more real or simulated feature control values. Then, one or more values may be held constant while one or more values are perturbed in order to determine the sensitivity of the predicted outcome to perturbations in a feature. As used herein, the term "feature control value" refers to a configurable parameter associated with a process, the alteration of which may affect one or more feature values used in a prediction model. For instance, altering a temperature or pressure setting associated with a manufacturing process may result in a change in temperature and/or pressure observed in a sensor associated with a machine in the manufacturing process.

One or more features are adjusted based on the feature sensitivity values at 106. Once feature sensitivity is determined, features may be selected for control. For instance, one or more features identified as exhibiting relatively high degrees of sensitivity may be controlled in order to alter a production process. Additional details regarding the determination of feature sensitivity and the adjustment of one or more feature control values are discussed with respect to the method 500 shown in FIG. 5.

Figure 2:
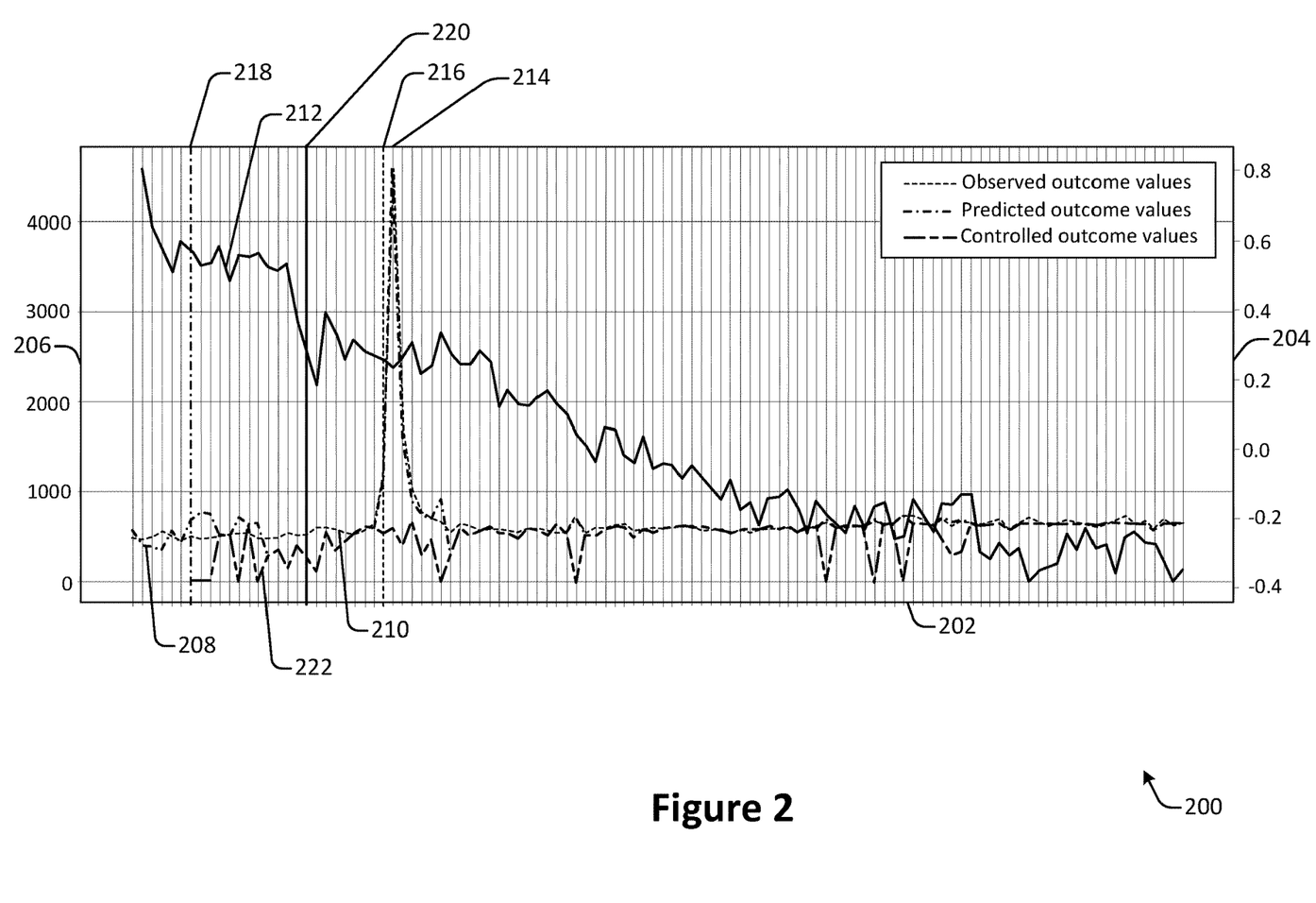
FIG. 2 illustrates an example of a plot, generated in accordance with one or more embodiments.

FIG. 2 illustrates an example of a plot 200, generated in accordance with one or more embodiments. The plot 200 was generated via a simulated production process. The y-axis 204 corresponds with a level of a drift metric 212 plotted over time, with time represented by the x-axis 202. The drift metric 212 may indicate, for instance, a similarity between a feature vector associated with a designated time period and a comparison feature vector associated with a prior time period. The second y-axis 206 corresponds with the number of defects per time interval in a production process.

In the plot 200, the drift metric 212 is decreasing in value over time. In the production process simulated in FIG. 2, a decrease in the drift metric 212 increases the likelihood of a sudden spike in defects. The simulated level of defects resulting from the trend in the drift metric 212 is plotted at 210 as the observed outcome values. As is seen at time interval 214, eventually this trend results in a sudden spike in defects.

According to various embodiments, a conventional prediction model may be used to predict an increase. For example, in FIG. 2, the predicted outcome values 208 closely track the observed outcome values 210. However, the prediction model may predict the increase in defects with insufficient lead time to make the adjustments necessary to prevent the sudden spike in defects. For example, the prediction model may accurately predict the increase in defects with a lead time of only one time cycle or a few time cycles.

According to various embodiments, in contrast to conventional techniques, drift analysis performed using techniques and mechanisms described herein may identify the conditions associated with a spike in defects well in advance. That is, change in a drift metric may indicate that a spike in defects at some point in the future is increasingly likely, without predicting either the size of the spike or exactly when the a spike will occur. The tradeoff for this loss in accuracy is that with drift detection the problem may be identified well in advance, for instance with sufficient time to adjust the system to avoid the spike entirely.

For example, in FIG. 2, the prediction model predicts the spike in defects at time period 216, too late to adjust the production process before the spike occurs at 214. In contrast, drift detection techniques such as those described herein identify the presence of drift at 218, which allows controls to be instituted at time 220. Because feature control is instituted at an earlier time period (i.e., time 220 as opposed to time 216), the production process can be controlled. The controlled outcome values, which exhibit no spike in defects, are plotted at 222.

Figure 3:
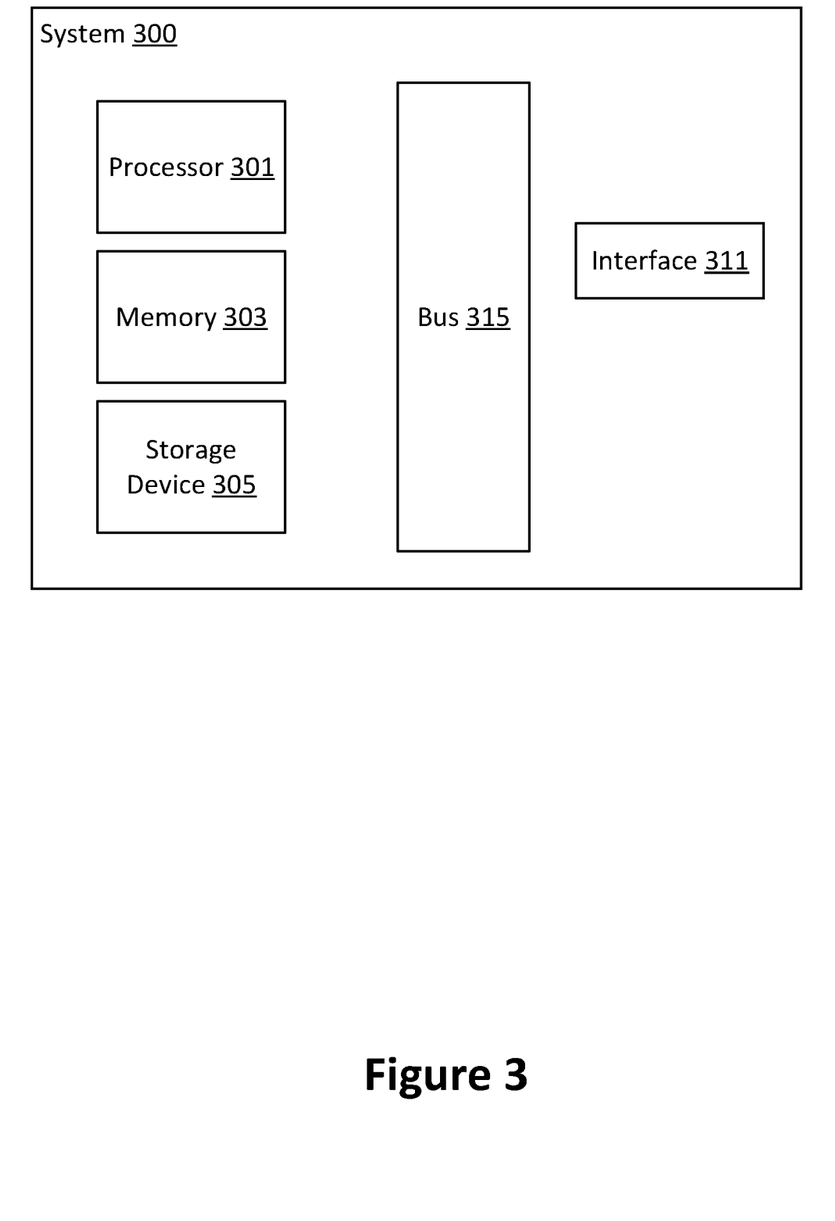
FIG. 3 illustrates one example of a computing device, configured in accordance with one or more embodiments.

FIG. 3 illustrates one example of a computing device or system 300. According to various embodiments, a device or system 300 suitable for implementing embodiments described herein includes a processor 301, a memory module 303, a storage device 305, an interface 311, and a bus 315 (e.g., a PCI bus or other interconnection fabric.) System 300 may operate as variety of devices such as an application server, hardware controller, or any other device or service described herein. Although a particular configuration is described, a variety of alternative configurations are possible. The processor 301 may perform operations such as implementing a prediction model, performing drift detection, and/or updating a prediction model. Instructions for performing such operations may be embodied in the memory 303, on one or more non-transitory computer readable media, or on some other storage device. Various specially configured devices can also be used in place of or in addition to the processor 301. The interface 311 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user. In some embodiments, the computing device 300 may be implemented in a cloud computing environment.

Figure 4:
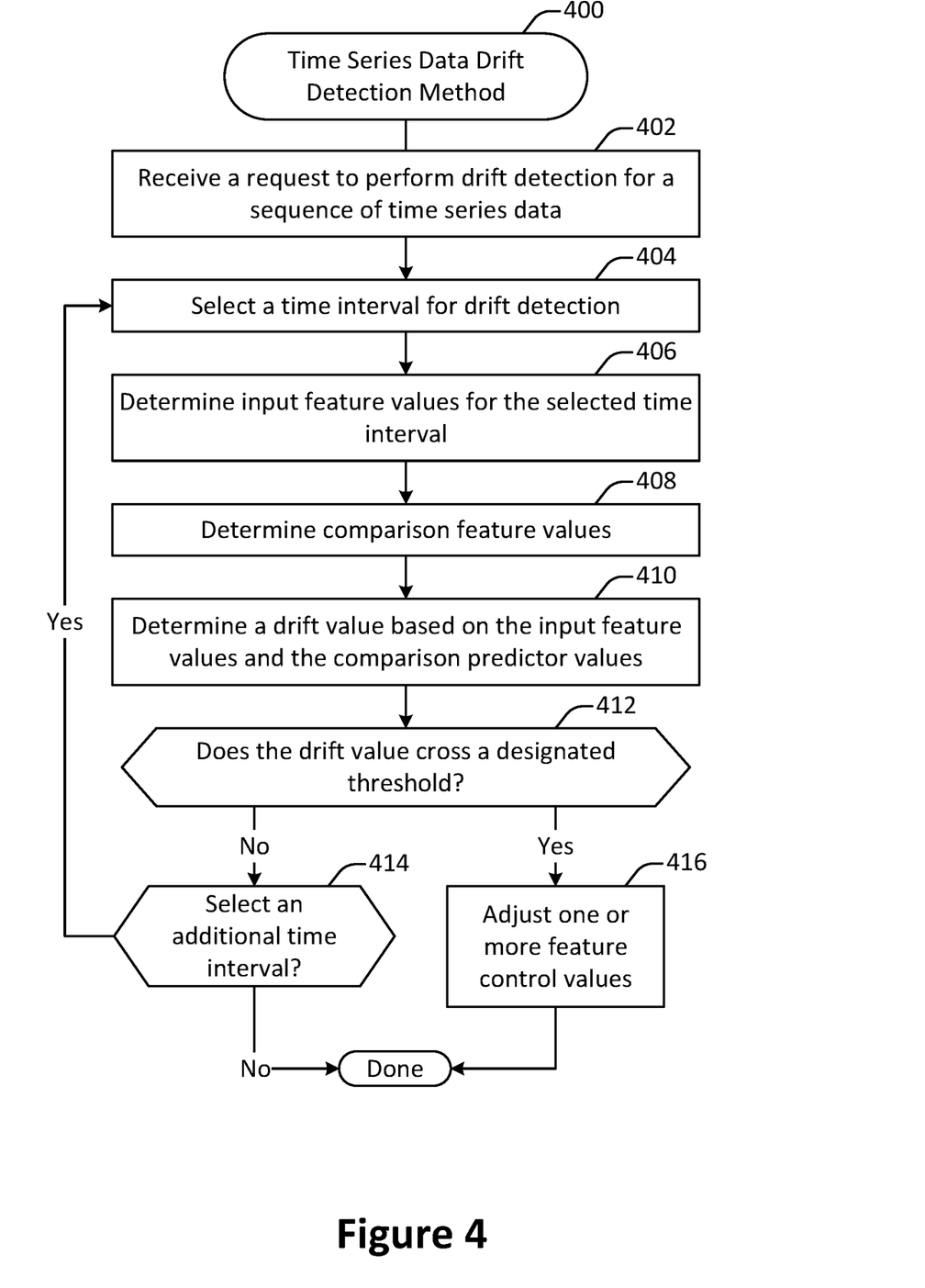
FIG. 4 illustrates a method for detecting drift in time series data, performed in accordance with one or more embodiments.

FIG. 4 illustrates a method 400 for detecting drift in time series data, performed in accordance with one or more embodiments. According to various embodiments, the method 400 may be performed in any suitable computing device. For example, the method 400 may be performed in a controller device configured to control one or more machines involved in a physical production process. As another example, the method 400 may be performed in a cloud computing device configured to receive inputs via a communication interface from a variety of remote sources via the internet.

A request to perform drift detection for a sequence of time series data is received at 402. According to various embodiments, the request may be generated automatically or manually. Any suitable time-series data may be analyzed. For example, time-series data may include data output by a physical process such as a production process. For instance, a machine may periodically output information such as temperature or pressure when performing a mechanical operation. As another example, time-series data may include sensor data output by a device. For instance, a battery system or elective vehicle charging system may provide periodic sensor readings indicating a state or condition associated with the condition.

A time interval for drift detection is selected at 404. According to various embodiments, the time interval may depend in part on the nature of the time series data. For instance, the time series data may be organized on granular time intervals such as once per second, once per minute, or some other unit of time. In such a configuration, the time interval for drift detection may include the most recent unit of time for which data is available.

Input feature values for the selected time interval are determined at 406. According to various embodiments, the feature values may be received via a communication interface. For instance, a controller may receive one or more feature values from a machine governed by the controller.

In some implementations, the input feature values may be organized as a vector, with different entries in the vector corresponding to different predictors. For instance, in a physical production process, a vector of feature values may include one or more temperature readings from various temperature sensors, one or more pressure readings from various pressure sensors, one or more voltage readings from various voltage sensors, and/or any other suitable information.

In some embodiments, the input feature values may be organized as a matrix, with different rows or columns in the matrix corresponding to vectors of feature values that in turn correspond to different time intervals. For example, in some configurations, the time interval for drift detection may include more than one set of temporal observations.

In some implementations, input feature values for different time intervals may be aggregated. For instance, in a dynamic process, the system may aggregate multiple recent time intervals to identify the presence of drift even in the presence of dynamic fluctuations in data values. Aggregation may involve determining means or other statistics based on combining data values from more than one set of temporal observations. For instance, successive temperature readings may be averaged via a mean function, median function, or other such functions.

Comparison feature values are determined at 408. According to various embodiments, the comparison feature values may be substantially similar in structure to the input feature values, but corresponding to a different period of time. For example, the comparison feature values may correspond to a designated fixed period of time immediately preceding the capture of the input feature values. As another example, the comparison feature values may correspond to a period of time in which the system was known to be operating in a desired state. As yet another example, the comparison feature values may correspond to a length of time that is strategically determined, the determination of which is discussed in more detail below.

In particular embodiments, the comparison feature vector may be associated with a time in the past separated from the present time by a designated lag period, such as one period, two periods, ten periods, or any number of suitable periods. The number of periods associated with the lag may be represented in the model as a tunable hyperparameter that can be tuned based on the particular context in which the model operates.

In particular embodiments, input feature values and/or comparison feature values may include one or more outcome values observed in the past. For instance, a past defect rate for a production process may be included as a feature value in the future for determining a drift value.

A drift value based on the input feature values and the comparison feature values is determined at 410. In some implementations, the drift value may be calculated using a distance metric between the comparison feature values and the input feature values. Depending on the configuration, any of a variety of distance metrics may be used.

In some embodiments, multiple comparison feature vectors may be aggregated into a single comparison feature vector. For example, a mean, median, or other aggregation function may be applied to a set of vectors of comparison predictors to produce a single comparison predictor vector. Then, the comparison predictor vector may be compared with an input predictor vector.

In some implementations, a cosine similarity measure may be used to compute an angular distance between a vector of comparison feature values and a vector of input feature values.

In some embodiments, feature values may be pre-processed. For example, one or more feature values may be centered and/or scaled to render the different feature values comparable. Scaling may involve, for instance, standardization or normalization.

In some embodiments, a cosine similarity measure may be weighted. For instance, the system may empirically determine that some predictors have an outsized effect when determining whether the system has drifted into a state that is likely to result in an error condition.

According to various embodiments, a distance measure other than cosine similarity may be used. For example, a Euclidean distance between two vectors may be used. As another example, a Mahalanobis distance may be calculated between the input feature values and a distribution of comparison values drawn from a desired state.

In some embodiments, a distance metric may be averaged over a moving window that includes a number of time periods. For example, a cosine similarity measure may be calculated for each time interval. Then, to produce a measure of drift for a particular time interval, the cosine similarity measure may be averaged with other cosine similarity measures that were calculated within the past five time periods. The size of the window may be represented in the model as a hyperparameter that is tuned according to the particular application. As another example, multiple cosine similarity measures may be calculated for a particular time period, each with a different lag between the focal feature vector and prior feature vectors. Then, these multiple cosine similarity measures may be aggregated, for instance by averaging them.

According to various embodiments, any or all of operations 406-410 may involve performing one or more cleaning operations. For example, a high frequency component of a value may be removed. As another example, a value may be sampled at a different rate. For instance, if a value is collected by a sensor at a rate of 10 times per second, those values may be averaged to produce a single value for a one-second interval. As yet another example, seasonal detrending may be applied to the data. For instance, values associated with a feature such as temperature may naturally vary over a production cycle, and such trends may be identified and removed before determining a drift value.

A determination is made at 412 as to whether a drift value crosses a designated threshold. In some implementations, a single drift value may be computed. Alternatively, multiple drift values may be computed, for instance for different aspects of a production process. In such a configuration, the system may seek to determine whether any one, or some number, of the computed drift values crosses a respective designated threshold.

In some embodiments, a drift metric may be calculated as a similarity value. In such a situation, a declining drift metric may indicate an increased likelihood of problems. Accordingly, the determination made at 412 may involve determining whether the drift metric crosses a designated threshold.

In some embodiments, a drift metric may be calculated as a distance value. In such a situation, an increasing drift metric may indicate an increased likelihood of problems. Accordingly, the determination made at 412 may involve determining whether the drift metric crosses a designated threshold.

If the drift value does not cross a designated threshold, then a determination is made at 414 as to whether to select an additional time interval for drift detection. According to various embodiments, additional time intervals may be selected continuously, or until a terminating condition is met.

If the drift value does cross a designated threshold, then at 416 one or more feature control values are adjusted. According to various embodiments, the term "feature" may refer to any configurable setting that, when altered, may affect one or more future feature values. In some embodiments, a predictor may correspond directly with a feature in a one-to-one relationship. For example, a configuration parameter may be used to alter a temperature setting, which may correspond directly with a temperature reading.

In some embodiments, a feature may be linked with multiple feature values. For example, a controller for a physical production process may be able to alter a force setting for a mechanical press. Altering the force setting may cause subsequent changes to observed values such as pressure, temperature, voltage, and the like.

According to various embodiments, adjusting one or more feature control values may involve sending a message via a communication interface that identifies the one or more features. Additionally, the message may include one or more magnitudes indicating a degree to which to adjust the one or more features. Additional details regarding the adjustment of one or more feature control values are discussed with respect to the method 500 shown in FIG. 5.

According to various embodiments, one or more of the operations shown in FIG. 4 may be performed in a different order. For instance, one or more operations may be performed in parallel, or in a sequence different than that shown.

In some implementations, some of the elements discussed with respect to FIG. 4 may be empirically determined. For instance, the system may analyze historical data and identify instances in which error conditions occurred. The system may then empirically determine parameters such as a drift detection threshold, a number of time intervals for selecting comparison feature values, and other such information based on the specific characteristics of the process being modeled.

Figure 5:
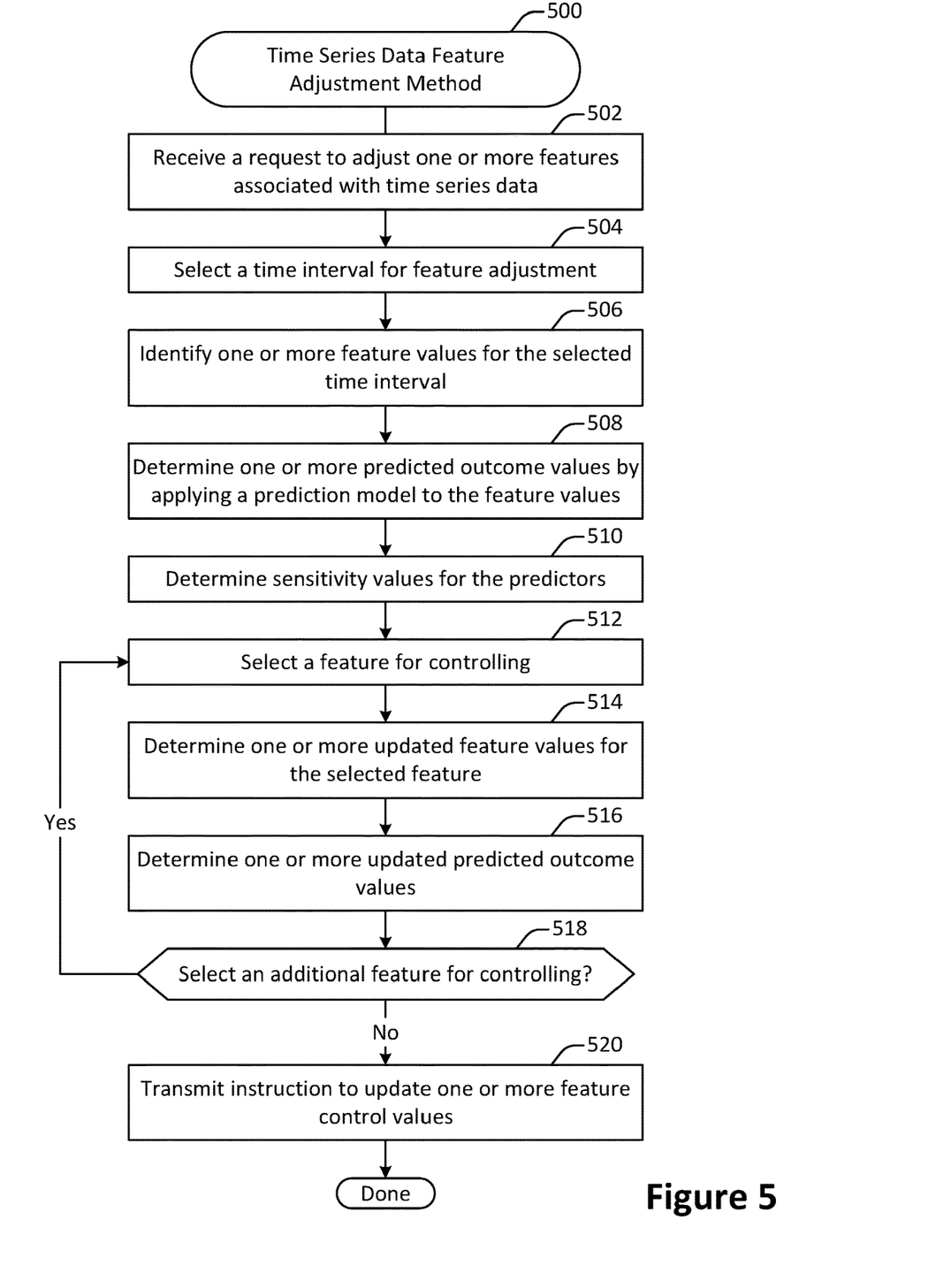
FIG. 5 illustrates an example of a method for implementing feature adjustment in time series data, performed in accordance with one or more embodiments.

FIG. 5 illustrates an example of a method 500 for implementing feature adjustment in time series data, performed in accordance with one or more embodiments. According to various embodiments, the method 500 may be performed in any suitable computing device. For example, the method 500 may be performed in a controller device configured to control one or more machines involved in a physical production process. As another example, the method 500 may be performed in a cloud computing device configured to receive inputs via a communication interface from a variety of remote sources via the internet.

A request to adjust one or more features associated with time series data is received at 502. In some implementations, the request may be received when drift is detected in the time series data. For instance, the request may be generated automatically when a determination is made at operation 412 that a drift value crosses a designated threshold.

A time interval for feature adjustment is selected at 504. In some embodiments, the time interval for feature adjustment may be the same as the time interval for drift detection discussed with respect to operation 404 shown in FIG. 4. Alternatively, a different time interval may be used. For instance, the time interval for feature adjustment may be greater than or less than the time interval for drift detection. Selecting a larger or smaller time interval for feature value in feature adjustment may, for instance, allow the model to be tuned so as to be more or less sensitive to recent changes in feature values.

Feature values for the selected time interval are identified at 506. In some embodiments, the feature values may include values for features such as those used to detect drift as discussed with respect to the method 400 shown in FIG. 4. The feature values may include values for various types of features. Types of features may include, but are not limited to: output values from sensors, defects from a manufacturing process, and control settings in a manufacturing process.

In some embodiments, a feature may be manipulable by the feature adjustment method. For example, a manufacturing process may involve a configurable setting for a feature such as temperature or pressure that can be adjusted by a hardware controller.

In some embodiments, a feature may not be manipulable by the feature adjustment method. For example, a sensor value may provide an indication of temperature or pressure for a region or component related to a manufacturing process. However, the temperature or pressure may be a consequence of other actions or operations within the manufacturing process and may not be directly adjustable. Nevertheless, the feature values associated with the feature may be predictive of output values such as a defect rate. Alternatively, or additionally, the feature values associated with the feature may be indirectly controllable. For instance, adjusting a production speed associated with the manufacturing process may indirectly alter a pressure or temperature value.

One or more outcome values are determined at 508 by applying a prediction model to the feature values. According to various embodiments, an outcome value may indicate a desired or undesired performance condition associated with a process. For example, an outcome value may indicate a defect rate or failure rate associated with a manufacturing process. As another example, an outcome value may indicate a rate of return or productivity.

In some implementations, any suitable prediction model may be used. For instance, the prediction model may involve a deep learning model, a neural network, a random forest, or any other suitable model. The prediction model may be trained by applying historical feature values to predict historical outcome values.

Sensitivity values for the predictors are determined at 510. According to various embodiments, a sensitivity value may indicate a degree of change in a predicted outcome value corresponding to a change in feature values for a feature. For instance, to determine a sensitivity value for a designated feature, the feature values for other features may be held fixed. The feature values for the designated feature may then be increased and/or decreased, and the prediction model re-run. The outcome values predicted by the prediction model using the modified feature values for the designated feature may then be compared with the outcome values predicted by the prediction model using the original feature values for the designated feature. The comparison of outcome values may reveal a degree to which the predicted outcome values are sensitive to changes in feature values corresponding with the designated feature. This process may be repeated potentially many times for a designated feature to more accurately gauge the sensitivity value for that feature.

According to various embodiments, sensitivity values may be determined for some or all of the predictors. However, sensitivity values need not necessarily be determined for all predictors. For instance, if a predictor corresponds with a feature that is not directly manipulable, determining a sensitivity value for that feature may be unwarranted.

In some embodiments, one or more feature values and/or outcome values may be preprocessed before applying the prediction model. Preprocessing may involve operations such as centering and/or scaling values. Depending on the context, values may be scaled to a range between zero and one, or may be scaled in another way. For instance, values may be scaled based on a number of standard deviations from a mean.

In some implementations, by centering and/or scaling values, feature values corresponding to different features may be more readily compared. For instance, sensitivity values may be determined based on a common scale applied to different predictors. For example, if all feature values are scaled to a range between zero and one, then different sensitivity values may indicate a degree of change in a predicted outcome value corresponding to a one percentage point change in feature values for different features, allowing the sensitivity of those features to be compared. As another example, if all feature values are scaled to a number of standard deviations from a mean, then different sensitivity values may indicate a degree of change in a predicted outcome value corresponding to a one standard deviation change in a feature value.

A feature is selected for controlling at 512. In some embodiments, features may be selected for controlling based at least in part on feature sensitivity values. For example, features may be ordered by sensitivity, and more sensitive features may be selected for controlling before less sensitive features. Feature sensitivity may be determined by, for instance, an absolute value of the sensitivity value for the feature.

In some embodiments, features may be selected based at least in part on one or more process-specific criteria. For instance, adjustment of some features may be easier and/or less costly than adjustment of other features. Accordingly, different features may be associated with weights that differentially penalize their adjustment. Such information may be used to select features for adjustment, alone or in combination with feature sensitivity values.

One or more updated feature values for the selected feature are determined at 514. In some embodiments, updated feature values may be determined based at least in part on a sign associated with a sensitivity value corresponding with a feature. For instance, if a sensitivity value is positive and the outcome value corresponds to an outcome where higher values are less desired, such as a default rate, then the value of the predictor may be decreased. If instead a sensitivity value is negative for such a feature, then the value of the predictor may be increased. The reverse may be true if the outcome value corresponds to an outcome where higher values are more desired.

In some embodiments, updated feature values may be determined based at least in part on a magnitude associated with a sensitivity values. For instance, relatively larger adjustments may be made for feature values corresponding with a feature having a relatively smaller magnitude for feature sensitivity, while relatively smaller adjustments may be made for feature values corresponding with a feature having a relatively larger magnitude for feature sensitivity.

In some embodiments, updated feature values may be determined based at least in part on process-specific characteristics. For instance, some feature values may be associated with features having discrete settings, such as a temperature setting that is configurable in integer degrees. In such a situation, updated feature values may correspond with setting values that may actually be applied by the controller.

One or more updated predicted outcome values are determined at 516. In some implementations, the one or more predicted outcome values may be determined by applying the prediction model in a manner similar to that discussed with respect to the operation 508.

In particular embodiments, updated predicted outcome values may be determined by applying the prediction model to the updated feature values determined at 514. The updated feature values may include those determined during the current and/or any past iterations of operations 512-518. For instance, operations 512-518 may be used to iteratively determine updated feature values for any or all of the features selected for controlling at 512, so that the ultimate result of operations 512-518 includes a set of updated feature control values that span some or all of the controllable features.

A determination is made at 518 as to whether to select an additional feature for controlling. In some implementations, the determination may be made at least in part based on whether the updated predicted outcome values meet one or more criteria. For example, if an outcome value includes a defect rate, features may continue to be adjusted until the predicted defect rate crosses a designated threshold. As another example, if an outcome value includes a productivity rate, features may continue to be adjusted until the productivity rate is no longer improved.

In some implementations, the determination made at 518 may be made at least in part based on whether all or a designated proportion of number of features have been analyzed. For instance, in some configuration each controllable feature may be selected for controlling in a designated sequence.

According to various embodiments, features may be selected for controlling in sequence, in parallel, or in any suitable order. For example, in some configurations each feature may be analyzed in sequence. As another example, in some configurations each feature may be analyzed in parallel.

In some embodiments, a group of features may be analyzed together. For example, features in a group of features may be logically related to a portion or aspect of a process. For instance, a production speed setting may indirectly affect pressure and temperature values from pressure and temperature sensors. In such a situation, updating feature values corresponding with the speed setting may involve updating feature values associated with the pressure and temperature sensors. Accordingly, such features may be analyzed as a group.

If it is determined not to select an additional feature for controlling, then at 520 an instruction is transmitted to update one or more feature control values. In some embodiments, the instruction may be transmitted via a communication interface to any device capable of updating the process modeled by FIG. 4 and FIG. 5. For example, the instruction may be transmitted to a hardware device associated with a production process. As another example, the instruction may be transmitted via a network such as the internet to a remote computing device. In some implementations, more than one instruction may be transmitted. For instance, different recipient devices may be responsible for controlling different aspects of a process.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A method comprising:
   determining via one or more processors a drift value by comparing a first plurality of feature values corresponding with a first time period with a second plurality of feature values corresponding with a second time period;
   determining via one or more processors a predicted outcome value by applying a prediction model to a third plurality of feature values;
   determining via one or more processors a plurality of sensitivity values corresponding with the third plurality of feature values when it is determined that the drift value crosses a designated drift threshold, a designated sensitivity value of the plurality of sensitivity values indicating a degree to which change in a designated feature value affects the predicted outcome value, the designated sensitivity value being determined by re-applying the prediction model while varying the designated feature value and holding fixed other feature values, wherein the third plurality of feature values correspond with a plurality of features determined by a data generating process;
   selecting a designated subset of the third plurality of feature values based on the plurality of sensitivity values, the designated subset of the third plurality of feature values corresponding with a subset of the plurality of features; and
   transmitting an instruction via a communication interface to update one or more control parameters in the data generating process corresponding with the designated subset of the third plurality of features based on the plurality of sensitivity values.

2. The method recited in claim 1, wherein the designated subset of the third plurality of feature values are selected based on a respective magnitude of a corresponding sensitivity value.

3. The method recited in claim 1, wherein selecting the designated subset of the third plurality of feature values includes ordering the plurality of sensitivity values based on magnitude.

4. The method recited in claim 1, wherein the instruction includes an adjustment magnitude value corresponding with the one or more control parameters.

5. The method recited in claim 1, the method further comprising:
   determining one or more simulated feature values based on the plurality of sensitivity values; and
   determining a simulated predicted outcome value by applying the prediction model to the simulated feature values.

6. The method recited in claim 5, the method further comprising:
   determining a plurality of updated sensitivity values corresponding with the plurality of features, a respective updated sensitivity value indicating a respective degree to which a change in a respective simulated feature value affects the determination of the simulated predicted outcome value by the prediction model.

7. The method recited in claim 1, the method further comprising:
determining whether the drift value crosses the designated drift threshold.

8. The method recited in claim 1, wherein determining the drift value comprises computing a cosine similarity value via a cosine similarity function based on a subset of the third plurality of feature values.

9. The method recited in claim 8, wherein the subset of the third plurality of feature values correspond with a designated time interval.

10. The method recited in claim 8, wherein determining the drift value further comprises determining a rolling average of a plurality of cosine similarity values.

11. The method recited in claim 1, wherein the first time period precedes the second time period, and wherein the first time period includes a plurality of time intervals, and wherein a subset of the first one or more feature values corresponds with a designated feature, and wherein each of the subset of the first one or more feature values corresponds with a respective one of the plurality of time intervals.

12. The method recited in claim 11, wherein determining the drift value involves computing an average of the subset of the first one or more feature values.

13. The method recited in claim 1, wherein the third one or more feature values includes the first one or more feature values and the second one or more feature values.

14. A system including one or more processors, the system configured to perform a method comprising:
determining via one or more processors a drift value by comparing a first plurality of feature values corresponding with a first time period with a second plurality of feature values corresponding with a second time period;
determining via one or more processors a predicted outcome value by applying a prediction model to a third plurality of feature values;
determining via one or more processors a plurality of sensitivity values corresponding with the third plurality of feature values when it is determined that the drift value crosses a designated drift threshold, a designated sensitivity value of the plurality of sensitivity values indicating a degree to which change in a designated feature value affects the predicted outcome value, the designated sensitivity value being determined by re-applying the prediction model while varying the designated feature value and holding fixed other feature values, wherein the third plurality of feature values correspond with a plurality of features determined by a data generating process;
selecting a designated subset of the third plurality of feature values based on the plurality of sensitivity values, the designated subset of the third plurality of feature values corresponding with a subset of the plurality of features; and
transmitting an instruction via a communication interface to update one or more control parameters in the data generating process corresponding with the designated subset of the third plurality of features based on the plurality of sensitivity values.

15. The system recited in claim 14, the method further comprising:

determining one or more simulated feature values based on the plurality of sensitivity values;
determining a simulated predicted outcome value by applying the prediction model to the simulated feature values; and
determining a plurality of updated sensitivity values corresponding with the plurality of features, a respective updated sensitivity value indicating a respective degree to which a change in a respective simulated feature value affects the determination of the simulated predicted outcome value by the prediction model.

16. The system recited in claim 14, wherein determining the drift value comprises computing a cosine similarity value via a cosine similarity function based on a subset of the third plurality of feature values, wherein the subset of the third plurality of feature values correspond with a designated time interval, and wherein determining the drift value further comprises determining a rolling average of a plurality of cosine similarity values.

17. The system recited in claim 14, wherein the first time period precedes the second time period, and wherein the first time period includes a plurality of time intervals, and wherein a subset of the first one or more feature values corresponds with a designated feature, and wherein each of the subset of the first one or more feature values corresponds with a respective one of the plurality of time intervals, and wherein determining the drift value involves computing an average of the subset of the first one or more feature values.

18. One or more non-transitory computer readable media having instructions stored thereon for performing a method, the method comprising:
determining via one or more processors a drift value by comparing a first plurality of feature values corresponding with a first time period with a second plurality of feature values corresponding with a second time period;
determining via one or more processors a predicted outcome value by applying a prediction model to a third plurality of feature values;
determining via one or more processors a plurality of sensitivity values corresponding with the third plurality of feature values when it is determined that the drift value crosses a designated drift threshold, a designated sensitivity value of the plurality of sensitivity values indicating a degree to which change in a designated feature value affects the predicted outcome value, the designated sensitivity value being determined by re-applying the prediction model while varying the designated feature value and holding fixed other feature values, wherein the third plurality of feature values correspond with a plurality of features determined by a data generating process;
selecting a designated subset of the third plurality of feature values based on the plurality of sensitivity values, the designated subset of the third plurality of feature values corresponding with a subset of the plurality of features; and
transmitting an instruction via a communication interface to update one or more control parameters in the data generating process corresponding with the designated subset of the third plurality of features based on the plurality of sensitivity values.

* * * * *